J. H. SAWYER.
Apparatus for Testing Strain of Belts or Bands.
No. 220,668. Patented Oct. 14, 1879.
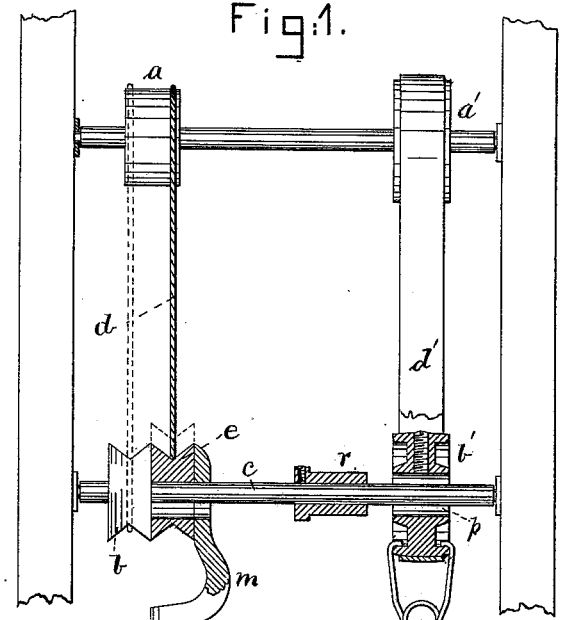
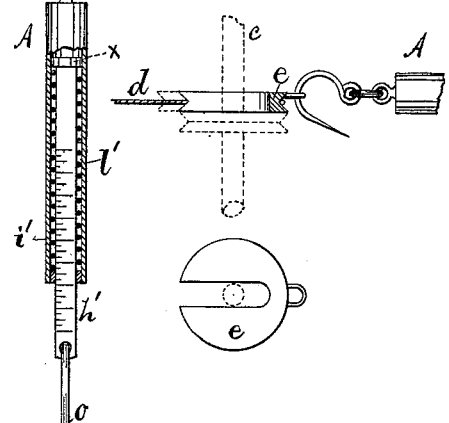
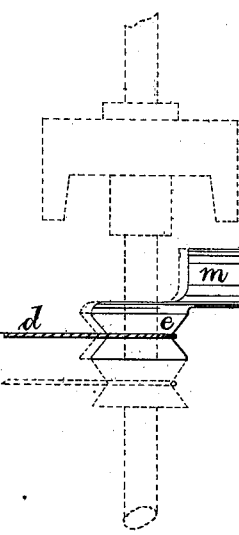
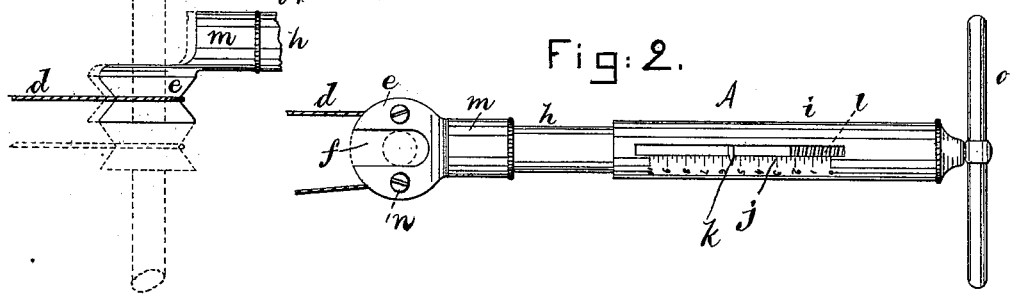
Witnesses.
Jos. P. Livermore
L. F. Connor
Inventor.
Jacob H. Sawyer
by Crosby & Gregory
Attys

UNITED STATES PATENT OFFICE.

JACOB H. SAWYER, OF LOWELL, MASSACHUSETTS.

IMPROVEMENT IN APPARATUS FOR TESTING STRAIN OF BELTS OR BANDS.

Specification forming part of Letters Patent No. 220,668, dated October 11, 1879; application filed May 19, 1879.

*To all whom it may concern:*

Be it known that I, JACOB H. SAWYER, of Lowell, county of Middlesex, State of Massachusetts, have invented an Apparatus for Testing Strain of Belts or Bands in Machinery, of which the following description, in connection with the accompanying drawings, is a specification.

My invention relates to an improved apparatus for ascertaining the tension on belts or bands used for transmitting power, and consists in mechanism for temporarily removing the strain from the shaft carrying one of a pair of pulleys, which are connected by an endless belt or other connected band, and measuring the strain thus removed by a spring-balance or other usual or equivalent measure of power acting in the opposite direction.

My invention also consists in the herein-described method of ascertaining the strain of a belt or band, which consists in holding the belt upon a belt-receiver or pulley placed loosely about the pulley-shaft, and by means of a strain-measuring device ascertaining the amount of strain necessary to place and keep the band or belt at such distance from the pulley-shaft as it will occupy when driving the pulley, such amount of strain indicated by the strain-measuring device indicating the strain of the band or belt.

Figure 1 represents at its left-hand side *in situ* an apparatus or device for measuring the strain on a band, and at its right-hand side a modified form, showing a plan for determining the strain on a belt supported on belt-pulleys. Fig. 2 represents one of my strain-measuring devices in top view. Fig. 3 shows my strain-measuring device as applied to a band of a spinning-spindle, and Fig. 4 is a detail of another modification.

Let $a$ represent a driven pulley or drum, which is to revolve the pulley or wheel $b$ on shaft $p$ or spindle $c$ through a band, $d$, the two shafts being suitably supported in proper bearings.

To ascertain the strain of the belt $d$, (shown in dotted lines as connecting the pulleys $a$ $b$,) I employ a band or belt receiver, $e$, made as an annulus or pulley of substantially the diameter and form of one of the pulleys $a$ or $b$, preferably the same as the driven pulley $b$; but this belt-receiver, which is shown at the left of Fig. 1 as fixed to the strain-measuring device A, is provided with a slot, $f$, extended into it from its periphery in a radial direction for a distance beyond its center greater than the radius of shaft $c$; or the said belt-receiver has at its center a slot or opening larger in area than the shaft $c$ is in cross-section.

The strain-measuring device A, herein delineated at the left of Fig. 1 and in Fig. 2, is shown as one form of spring-balance, composed of an internal tube or rod, $h$, an external tube, $i$, having a proper scale, $j$, (see Fig. 2,) to co-operate with the fixed index-finger $k$, the two parts $h$ $i$ being connected by means of a spring, $l$, and a suitable shank, $m$, to which the belt or band receiver is detachably connected by screws $n$, to thereby permit the receiver to be changed as may be desired, to enable a receiver of proper diameter to be employed, according to the diameter of pulley $b$.

The strain-measuring device will preferably be provided with a handle, $o$, made either as a loose ring or as a bar.

To measure the strain of band $d$, place the slotted band receiver or holder $e$ about the shaft $c$ at the side of the pulley $b$, and remove band $d$ from its dotted-line position to the position shown in full lines about the receiver or holder $e$, and then, by power applied to the strain-measuring device, draw the said device so as to strain the band enough to place the band-holding portion of the receiver $e$ at the same distance from the center of shaft $c$ as the like portion of pulley $b$ is from the center of the same shaft. The strain exerted on the band to enable these two like portions of the pulley and receiver to be placed in the same line, at the same distance from the center of shaft or spindle $c$, is exhibited in pounds and ounces by the strain-measuring apparatus and indicates the strain of the said band, or the amount of strain under which it is held when placed in operative position or in the position shown in dotted lines.

In Fig. 3 I have shown in dotted lines a spinning-spindle and whirl with a band-receiver in position above the usual whirl, the spring-balance part being broken away; but said part is fully shown in Fig. 2.

At the right of Fig. 1 I have shown a flat belt, $d'$, placed about two flat or plain pulleys, $a'$ $b'$.

The pulley $b'$ is shown as provided with a central opening, $p$, considerably larger than the shaft $c$, large enough to receive within it a movable sleeve, $r$.

When the band $d'$ is driving the pulley $b$, the sleeve is duly interposed between the pulley $b'$ and shaft $c$; but when the strain of band $d'$ is to be ascertained, the sleeve is withdrawn from the pulley, as shown in Fig. 1, and the strain-measuring apparatus is made to hook upon or is otherwise connected with the said pulley $b'$, which, in its loose condition, becomes the belt-receiver, and the power or force indicated upon the spring-balance or strain-measuring device to draw the loose pulley until the opening at its center coincides with the outer portion of the sleeve $r$ will indicate upon the strain-measuring device the strain or tension of the belt.

At the right of Fig. 1 the strain-measuring device A is shown as that kind of a spring scale or balance in which the central rod, $h'$, is graduated to indicate pounds, and a head, $x$, on the said rod compresses a spiral spring, $l'$, in the outer case, $i'$.

In Fig. 4, as well as at the right of Fig. 1, I have shown the strain-measuring device as provided with a proper hook or hooks.

Instead of fixing the belt-receiver upon the strain-measuring device, or connecting them rigidly, as in Fig. 2 and at the left of Fig. 1, I may make them separate and connect them loosely, as in Fig. 4.

It is desirable in all machinery or factories to be able to ascertain and adjust the strain or tension of bands or belts to correspond with the amount of work to be performed, all excess of strain or tension above the amount absolutely necessary to drive the machinery and perform the duty being lost power and hurtful to the parts connected by the said belts or bands, as the wear is greatly enhanced.

Prior to my invention I am not aware that any readily applicable way of testing and ascertaining the strain of driving belts or bands has been devised.

Any other well-known or equivalent measure of strain or weight may be employed instead of the particular devices herein shown.

It is obvious, instead of a spring-balance, that I may attach to the belt-receiver a flexible connection, as a cord, extend it over a roller, and apply weights to the cord to raise the belt-receiver to the proper position, the said weights indicating the degree or amount of strain of the said belt when in operation.

I claim—

1. The strain-measuring device, substantially as described, provided with a belt-receiver slotted to embrace a shaft and receive a belt or band upon it, substantially as described.

2. A slotted annular belt-receiver and attached strain-measuring device, said receiver being of the same diameter as the pulley upon which rests the band to be tested, the radial slot in the receiver being extended into it for a distance beyond its center greater than the radius of the said shaft, to operate substantially as set forth.

3. That improvement in the art or or method of ascertaining the tension of an endless band or belt connecting two pulleys on two shafts which consists, first, in temporarily holding or supporting the band or belt to be tested by means of an annulus or pulley disconnected from but surrounding one of the said shafts, the annulus or pulley having a central opening of greater diameter than the said shaft; secondly, connecting with such loose belt or band holder a strain-measuring device or spring-balance to draw and hold the band-holding portion of the periphery of the said slotted annulus or pulley in such position from the center of one of the said shafts as the band or belt will occupy with relation to the center of the said shaft when the band or belt and the said shaft and the pulleys thereon are in operation, the said strain-measuring device, when the said loosely-held slotted annulus or pulley is drawn to strain and place the band or belt in the position described with relation to the axis of the shaft surrounded by the said annulus or pulley, indicating the strain or tension of the said band or belt when the said band or belt is made to travel and rotate the two shafts and their pulleys, the pulleys holding the said bands or belts being then fixed upon the said shafts, all substantially as described.

4. The grooved and slotted belt receiver or holder, adapted to surround and receive upon it the endless belt or band to be tested, substantially as described.

In testimony whereof I have signed my name to this specification in the presence two subscribing witnesses.

JACOB H. SAWYER.

Witnesses:
 G. W. GREGORY,
 N. E. WHITNEY.